United States Patent
Chung et al.

(10) Patent No.: US 10,270,110 B2
(45) Date of Patent: Apr. 23, 2019

(54) METHOD FOR SYNCHRONIZING VOLTAGE OF FUEL CELL VEHICLE

(71) Applicant: Hyundai Motor Company, Seoul (KR)

(72) Inventors: Sung Jin Chung, Gyeonggi-Do (KR); Sung Gone Yoon, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 470 days.

(21) Appl. No.: 15/146,159

(22) Filed: May 4, 2016

(65) Prior Publication Data
US 2017/0033380 A1 Feb. 2, 2017

(30) Foreign Application Priority Data
Jul. 29, 2015 (KR) .................. 10-2015-0107038

(51) Int. Cl.
| | | |
|---|---|---|
| *H01M 8/04* | (2016.01) | |
| *H01M 8/04858* | (2016.01) | |
| *H01M 8/04302* | (2016.01) | |
| *B60L 11/18* | (2006.01) | |
| *H01M 8/04992* | (2016.01) | |
| *H01M 8/1007* | (2016.01) | |
| *B60L 1/00* | (2006.01) | |
| *H01M 16/00* | (2006.01) | |

(52) U.S. Cl.
CPC ..... *H01M 8/04865* (2013.01); *B60L 11/1885* (2013.01); *H01M 8/0488* (2013.01); *H01M 8/04302* (2016.02); *H01M 8/04992* (2013.01); *B60L 1/00* (2013.01); *H01M 8/1007* (2016.02); *H01M 16/006* (2013.01); *H01M 2250/20* (2013.01); *Y02T 90/32* (2013.01); *Y02T 90/34* (2013.01)

(58) Field of Classification Search
CPC ......... H01M 8/04225; H01M 8/04865; H01M 8/04302; H01M 8/043; H01M 8/04223; H01M 8/04298; H01M 8/04305; H01M 8/04313; H01M 8/04544; H01M 8/04552; H01M 8/04559; H01M 8/04858; H01M 8/0488
See application file for complete search history.

(56) References Cited

FOREIGN PATENT DOCUMENTS

| | | |
|---|---|---|
| JP | 2007-305347 A | 11/2007 |
| JP | 2009-153344 A | 7/2009 |
| JP | 2015-128040 A | 7/2015 |

(Continued)

*Primary Examiner* — Anthony R Jimenez
(74) *Attorney, Agent, or Firm* — Mintz Levin Cohn Ferris Glovsky and Popeo, P.C.; Peter F. Corless

(57) ABSTRACT

A method for synchronizing voltages of a fuel cell vehicle may synchronize the voltages of high voltage components in real time regardless of the completion of vehicle start-up in order to improve performance and control precision within a full range of operable voltages. The method includes a default voltage synchronization step in which, when the fuel cell vehicle starts, the voltages of the high voltage components are corrected based on an offset value, stored in advance in multiple auxiliary controllers for controlling the high voltage components, and the corrected voltages are further corrected according to a default voltage synchronization command of a main controller; and a real-time voltage synchronization step in which, after the default voltage synchronization step, the main controller transmits a target offset value to the auxiliary controllers, and the auxiliary controllers correct the voltages based on the target offset value.

16 Claims, 5 Drawing Sheets

(56) References Cited

FOREIGN PATENT DOCUMENTS

| | | |
|---|---|---|
| KR | 10-2005-0057895 | 6/2005 |
| KR | 10-2006-0112680 A | 11/2006 |
| KR | 10-1481355 | 1/2015 | ant
METHOD FOR SYNCHRONIZING VOLTAGE OF FUEL CELL VEHICLE

CROSS REFERENCE TO RELATED APPLICATION

The present application claims under 35 U.S.C. § 119(a) the benefit of Korean Patent Application No. 10-2015-0107038, filed Jul. 29, 2015, the entire contents of which are incorporated by reference herein.

BACKGROUND

1. Field of the Invention

The present invention generally relates to a method for synchronizing voltages of a fuel cell vehicle, more particularly, to a method for synchronizing voltages of a fuel cell vehicle, in which the voltages of high voltage components may be synchronized in real time regardless of the completion of vehicle start-up in order to improve performance and control precision within a full range of operable voltages.

2. Description of the Related Art

Generally, a fuel cell vehicle is driven by electricity generated by an electrochemical reaction of hydrogen, which is supplied as fuel, and oxygen in the air. A fuel cell vehicle includes not only a fuel cell stack for generating high voltage power from fuel but also various components for controlling output power, which are connected in parallel on a high voltage bus. Measuring devices or controllers for high voltage components include a stack voltage monitor (SVM), a motor control unit (MCU), a power conversion controller (a DC/DC controller), a blower/pump control unit (BPCU), a high voltage battery management system (BMS), and the like.

With regard to driving a motor when accelerating a vehicle and energy recovery through regenerative braking when decelerating the vehicle, the vehicle is controlled by systematic and cooperative control between high voltage components. Here, driving the motor and the output of regenerative braking may be controlled in such a way that a power conversion controller controls the voltage of a high voltage bus within a range from permissible minimum to maximum voltage thereof. In other words, when the voltage reaches the permissible maximum or minimum voltage while a vehicle is driven, each of the high voltage controllers performs output derating (limits the operation) in order to protect the high voltage components. Accordingly, when the voltages measured by all of the above-mentioned high voltage components have no difference, desired control precision and performance may be achieved.

For example, when a fuel cell control unit (FCU) transmits a voltage command for regenerative braking energy recovery to a power conversion controller, the power conversion controller controls a voltage depending on the command and stores the recovered energy in a high voltage battery. However, if the voltage differs from a voltage measured by a MCU, specifically, if the voltage measured by the MCU has a higher value, regenerative braking torque decreases due to the upper limit of the voltage, thus the desired amount of energy cannot be recovered.

Also, when a vehicle is about to slide backwards because it starts on an uphill slope after stopping, a motor rotates in reverse to prevent the vehicle from sliding backwards, thus some regenerative braking occurs. In this case, if the voltage of the MCU is greater than the voltage of the power conversion controller by a specific offset value, the voltage of the MCU increases by regenerative braking. As a result, when the voltage of the MCU reaches the maximum voltage in which regenerative braking is not allowed, derating is performed. When derating is performed in the MCU, the voltage decreases again and regenerative braking occurs. Consequently, because the regenerative braking, an increase in the voltage, and the derating attributable to the increase in the voltage are repeated, the vehicle may be subject to significant vibration. This phenomenon also occurs because the voltage of the power conversion controller depending on the voltage command transmitted from the fuel cell controller differs from the voltage of the MCU.

Also, when a stack generates power with low efficiency in order to increase the amount of heat from the stack during a cold start, the voltage of a high voltage bus is controlled depending on a minimum permissible voltage. In this case, the time for the cold start may be reduced only when the voltage is correctly controlled depending on the minimum permissible voltage under the condition in which the voltages of components have little error.

As described above, a power conversion controller controls the voltage of a bus depending on a voltage control command transmitted from a fuel cell controller within a range from the permissible minimum to maximum voltage. In this case, if the voltages, measured by the MCU, the power conversion controller, the BPCU, the high voltage battery management system, and the like, have errors, derating may occur. Specifically, during regenerative braking, derating may occur due to a component that first reaches the maximum voltage among the above-mentioned components. Also, when driving a motor or when generating power at low voltage during a cold start, derating may occur due to a component that first reaches the minimum voltage. As a result, it is difficult to achieve a targeted control performance of the fuel cell controller.

In contrast, when the voltages of all the high voltage components in the fuel cell vehicle ideally have the same value, abnormal operations and a control performance decrease caused by the difference of the voltages may be avoided.

The foregoing is intended merely to aid in the understanding of the background of the present invention, and is not intended to mean that the present invention falls within the purview of the related art that is already known to those skilled in the art.

SUMMARY

Accordingly, the present invention provides a method and system for synchronizing voltages of a fuel cell vehicle, in which the voltages of high voltage components may be synchronized in real time regardless of the completion of vehicle start-up in order to improve performance and control precision within a range from minimum to maximum operable voltage.

In order to achieve the above object, according to one aspect of the present invention, there is provided a method for synchronizing voltages of a fuel cell vehicle, which includes: a default voltage synchronization step in which, when the fuel cell vehicle starts, voltages of high voltage components are corrected based on an offset value, and then the corrected voltages are further corrected according to a default voltage synchronization command of a main controller, the offset value having been stored in advance in multiple auxiliary controllers for controlling the high voltage components of the fuel cell vehicle; and a real-time voltage synchronization step in which, when the default voltage synchronization step has been completed, the main controller transmits a target offset value for correcting the voltages of the high voltage components to the auxiliary controllers, and the auxiliary controllers correct the voltages corrected in the default voltage synchronization step based on the target offset value, the target offset value being based on the voltages corrected in the default voltage synchronization step and an output voltage of a fuel cell stack.

According to an embodiment of the present invention, in the default voltage synchronization step, regardless of whether a fuel cell has been started, the multiple auxiliary controllers may correct the voltages of the high voltage components based on the stored offset value.

According to an embodiment of the present invention, in the default voltage synchronization step, the multiple auxiliary controllers may correct the voltages by a preset level based on the stored offset value.

According to an embodiment of the present invention, in the default voltage synchronization step, when the multiple auxiliary controllers correct the voltages by the preset level based on the stored offset value, if a result of correcting falls within a preset maximum permissible range of an offset, the multiple auxiliary controllers may wait for the default voltage synchronization command from the main controller, whereas if the result is out of the preset maximum permissible range of the offset, the multiple auxiliary controllers may transmit a synchronization completion signal to the main controller.

According to an embodiment of the present invention, in the default voltage synchronization step, when the auxiliary controllers receive the default voltage synchronization command from the main controller, the auxiliary controllers may correct the voltages by the entire stored offset value.

According to an embodiment of the present invention, in the default voltage synchronization step, when starting of a fuel cell has been completed, the main controller may determine whether a device for measuring the stack voltage is normal, and when the device for measuring the stack voltage is normal, the main controller may transmit the default voltage synchronization command to the auxiliary controllers.

According to an embodiment of the present invention, in the real-time voltage synchronization step, the main controller may calculate an average offset value depending on a difference between the output voltage of the fuel cell stack and the voltages corrected in the default voltage synchronization step, and may set the target offset value based on the average offset value.

According to an embodiment of the present invention, in the real-time voltage synchronization step, when the target offset value falls within a preset critical range, the main controller may terminate synchronizing the voltages.

According to an embodiment of the present invention, in the real-time voltage synchronization step, when the target offset value is out of a preset critical range, the main controller may determine whether a magnitude of the target offset value is capable of being immediately corrected by checking a driving condition of the fuel cell vehicle.

According to an embodiment of the present invention, in the real-time voltage synchronization step, when the magnitude of the target offset value is capable of being immediately corrected, the main controller may transmit a real-time offset compensation value corresponding to the target offset value and a first real-time voltage synchronization command for instructing compensation of the real-time offset compensation value to the auxiliary controllers.

According to an embodiment of the present invention, in the real-time voltage synchronization step, when the magnitude of the target offset value is not capable of being immediately corrected, the main controller may transmit a real-time offset compensation value corresponding to a preset minimum offset compensation value and a second real-time voltage synchronization command for instructing compensation of the real-time offset compensation value.

According to an embodiment of the present invention, in the real-time voltage synchronization step, when receiving the real-time offset compensation value, the auxiliary controllers may calculate an amount of the voltage to be corrected based on the real-time offset compensation value, and may correct the voltages within a preset permissible range for offset compensation.

According to an embodiment of the present invention, in the real-time voltage synchronization, when it is determined that further correction is available after the auxiliary controllers correct the voltages within the preset permissible range for offset compensation, the auxiliary controllers may transmit the corrected voltages to the main controller and wait for an additional real-time voltage synchronization command.

An embodiment of the present invention may further include an offset storage step in which the auxiliary controllers store a filially corrected offset value when receiving a voltage synchronization termination command from the main controller.

As described above, according to the method for synchronizing the voltages of a fuel cell vehicle, the voltages may be synchronized in real time regardless of a driving condition from when starting a vehicle to when stopping the vehicle, and regenerative braking performance and fuel efficiency of the fuel cell vehicle may be improved.

Also, according to the method for synchronizing the voltages of a fuel cell vehicle, a vehicle is prevented from vibration that may be caused because derating according to a reference output of a MCU and releasing the derating are alternately repeated, whereby ride quality may be improved. Also, the maximum output of a motor may be maintained within a range of the maximum power of a fuel cell stack, and a cold start time during which the fuel cell stack generates power at low voltage with low efficiency may be reduced, whereby the life of the fuel cell stack may be prolonged and vehicle performance may be improved.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION OF THE INVENTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present invention may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinbelow, a method for synchronizing voltages of a fuel cell vehicle according to various embodiments of the present invention will be described in detail with reference to the accompanying drawings.

Figure 1:
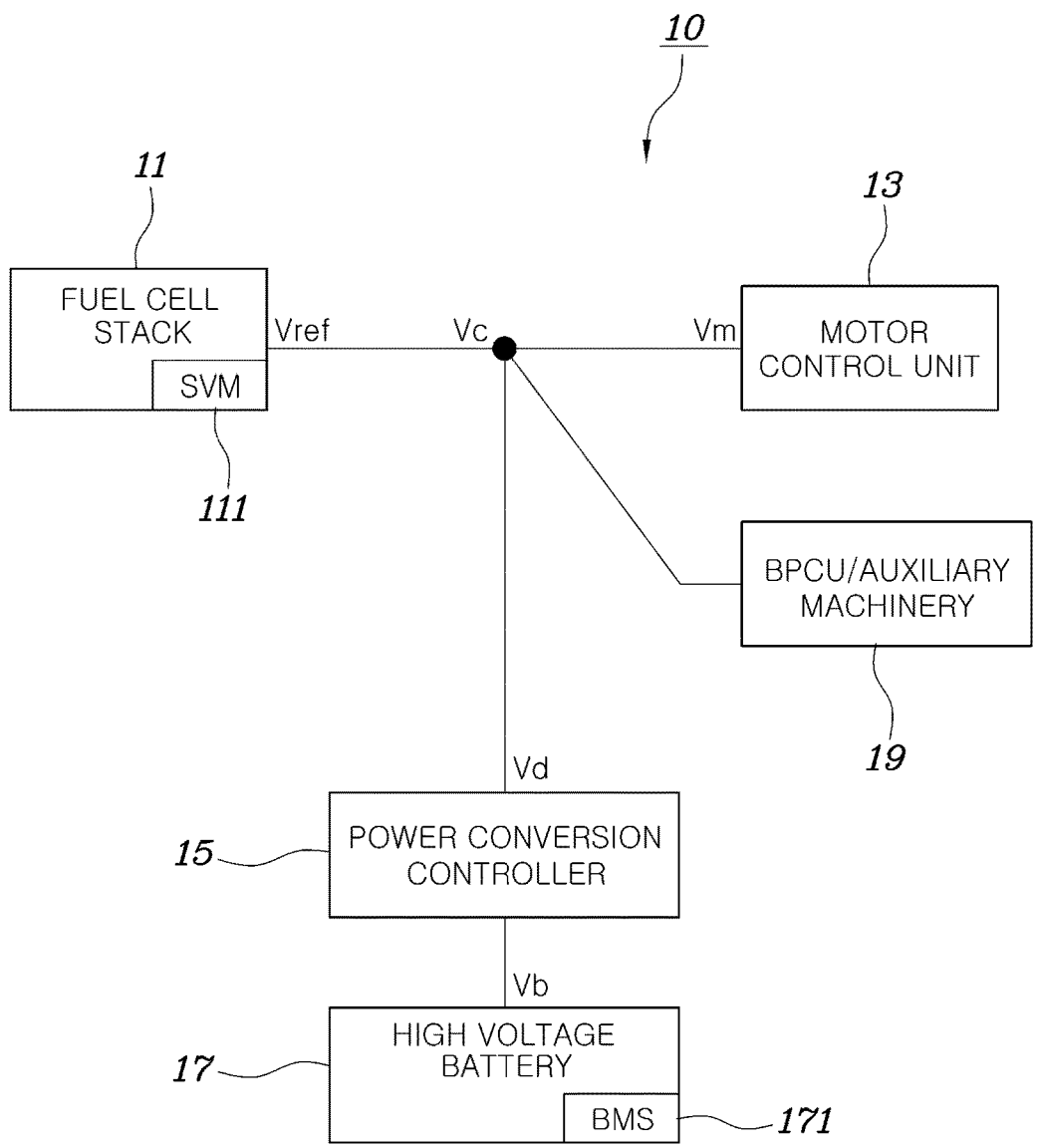
FIG. 1 is a block diagram of a high voltage power net of a fuel cell vehicle to which a method and system for synchronizing voltages of a fuel cell vehicle according to an embodiment of the present invention are applied.

FIG. 1 is a block diagram of a high voltage power net of a fuel cell vehicle to which a method for synchronizing voltages of a fuel cell vehicle according to an embodiment of the present invention is applied.

Referring to FIG. 1, a high voltage power net 10 of a fuel cell vehicle, to which a method and system for synchronizing voltages of a fuel cell vehicle according to an embodiment of the present invention are applied, may include a fuel cell stack 11, a motor control unit (MCU) 13, a power conversion controller 15, a high voltage battery 17, and a blower/pump control unit (BPCU)/auxiliary machinery 19.

The output voltage of the fuel cell stack 11 may be sensed by a stack voltage monitor (SVM) 111. The MCU 13 may include a voltage sensor (not illustrated) for sensing an input voltage. The power conversion controller 15, which is a controller arranged in a high voltage DC-DC converter, may sense the voltage of a terminal connected to the fuel cell stack 11 and the voltage of a terminal connected to the high voltage battery 17. The high voltage battery 17 may include a battery management system 171. The BPCU 19 senses the voltage applied to a blower/pump, and the auxiliary machinery 19 also may include a voltage sensor for sensing the voltage applied thereto.

Here, ideally, the output voltage Vref of the fuel cell stack 11, the voltage Vm sensed in the MCU 13, and the voltage Vd of the terminal of the power conversion controller 15, sensed at the side of the fuel cell stack 11, must be the same as the voltage Vc of a node to which all the high voltage lines are connected. However, actually, because the SVM 111 in the fuel cell stack 11, the voltage sensor of the MCU 13, the power conversion controller 15, and the like have some voltage sensing errors, they may sense different voltages.

Accordingly, it is necessary to synchronize the sensed voltages at a specific time and a specific level in order for the controllers to sense the same voltage, whereby the control precision of each of the controllers may be improved while a fuel cell vehicle is driven. In an embodiment of the present invention, based on the voltage sensed by the SVM 111, which has the highest precision in sensing voltage, the voltages sensed by the other controllers may be synchronized.

Figure 2:
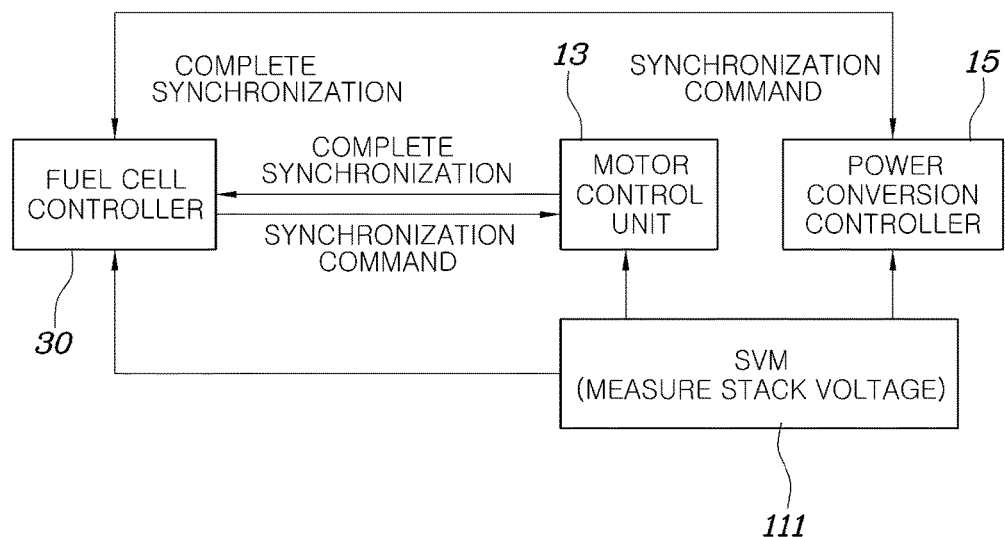
FIG. 2 is a block diagram illustrating a system that implements a method for synchronizing voltages of a fuel cell vehicle according to an embodiment of the present invention.

FIG. 2 is a block diagram of a system that implements a method for synchronizing voltages of a fuel cell vehicle according to an embodiment of the present invention.

Referring to FIG. 2, a system that implements a method for synchronizing voltages of a fuel cell vehicle according to an embodiment of the present invention may include a fuel cell controller 30, which is a main controller, a motor control unit (MCU) 13 and a power conversion controller 15, which are auxiliary controllers for controlling high voltage components, and a stack voltage monitor 111 for monitoring and measuring a stack voltage.

In an embodiment of the present invention, the fuel cell controller 30 (i.e., a main controller) may transmit a synchronization command to the auxiliary controllers 13 and 15, receive a synchronization completion notification from the auxiliary controllers 13 and 15, and perform calculation to synchronize voltages.

In an embodiment of the present invention, the MCU 13 and the power conversion controller 15, corresponding to auxiliary controllers, may perform control to synchronize the voltages of a motor and a power conversion unit, which are respectively controlled by the MCU 13 and the power conversion controller 15.

The stack voltage monitor 111 may present a voltage of a fuel cell stack, which is the reference voltage for synchronizing voltages.

Figure 3:
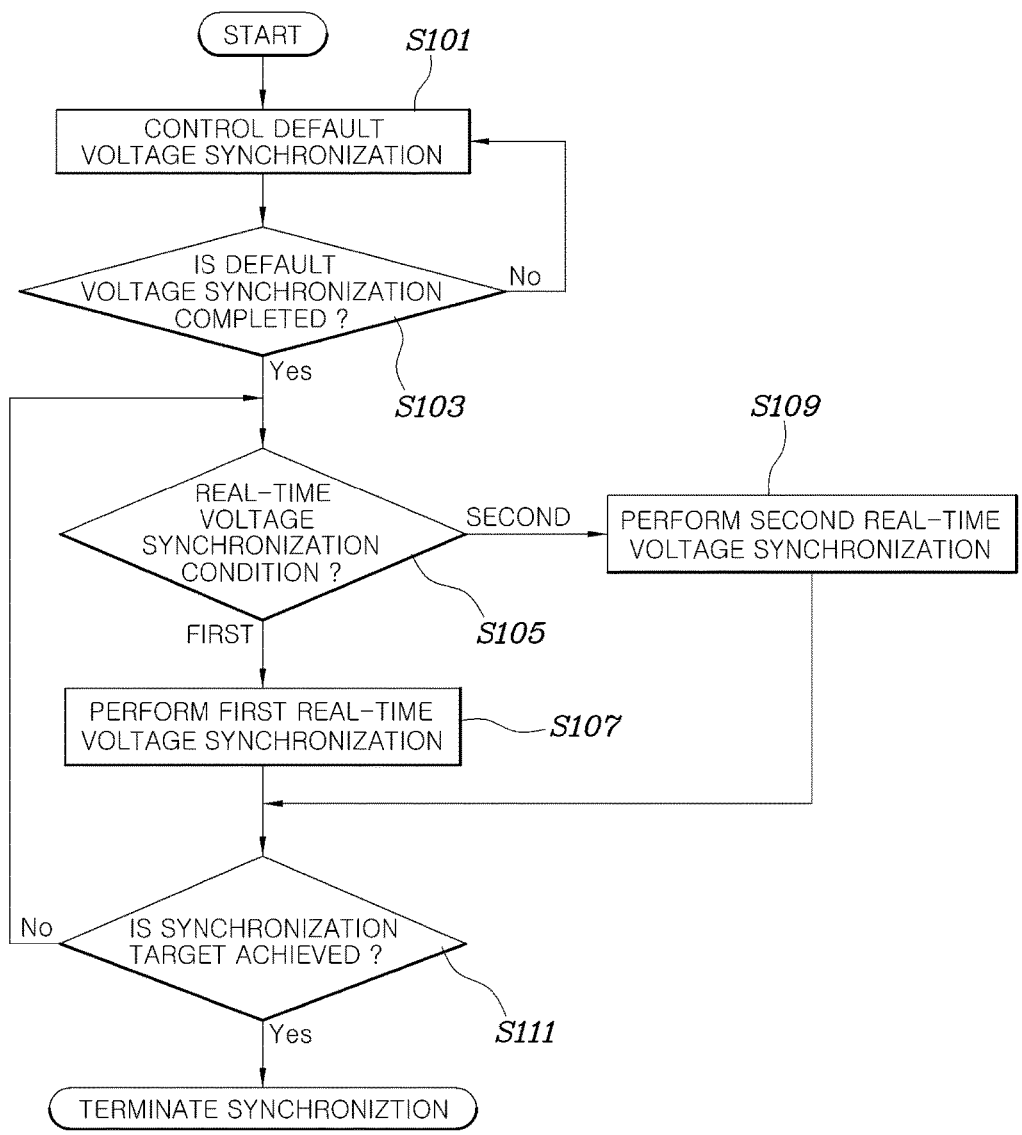
FIG. 3 is a flowchart of a method for synchronizing voltages according to an embodiment of the present invention.

FIG. 3 is a flowchart of a method for synchronizing voltages according to an embodiment of the present invention.

Referring to FIG. 3, a method for synchronizing voltages according to an embodiment of the present invention may include a default voltage synchronization step (S101) and a real-time voltage synchronization step (S105, S107, and S109), which is performed after the completion (S103) of the default voltage synchronization step (S101). The method for synchronizing voltages according to an embodiment of the present invention may terminate the synchronization when a synchronization target is achieved (S111).

The default voltage synchronization step (S101) may be a step in which, when a fuel cell vehicle is started, the voltages of high voltage components are corrected based on an offset value, and then the corrected voltages are further corrected in response to a default voltage synchronization command from a main controller 30, the offset value having been stored in advance in multiple auxiliary controllers (for example, a MCU 13 and a power conversion unit 15) for controlling the high voltage components of the fuel cell vehicle.

The real-time voltage synchronization step (S105, S107, and S109) may be a step in which the main controller 30 transmits a target offset value for correcting the voltages of the high voltage components to the auxiliary controllers 13 and 15 after the default voltage synchronization step (S101) has been completed, and the auxiliary controllers 13 and 15 further correct the voltages corrected in the default voltage synchronization step (S101) based on the target offset value, the target offset value being based on the voltages corrected in the default voltage synchronization step (S101) and the output voltage of the fuel cell stack, sensed by the fuel cell stack voltage monitor 111.

The real-time voltage synchronization step (S105, S107, and S109) may include a process (S105) in which the main controller 30 calculates the target offset value for correcting the voltages of the high voltage components based on the voltages corrected in the default voltage synchronization step (S101) and the output voltage of the fuel cell stack, sensed by the fuel cell stack voltage monitor 111, and determines a condition for real-time voltage synchronization depending on whether the voltages can be immediately corrected according to the target offset value in the current driving condition of a vehicle.

In this process (S105), if it is determined that the voltages can be immediately corrected according to the target offset value, the first real-time voltage synchronization control (S107) is performed so that the voltages are immediately corrected according to the target offset value. Conversely, if it is determined that the voltages cannot be immediately corrected according to the target offset value, the second real-time voltage synchronization control (S109) is performed so that a voltage value is divided by a certain unit and correction is gradually performed to reach the target offset value.

Figure 4:
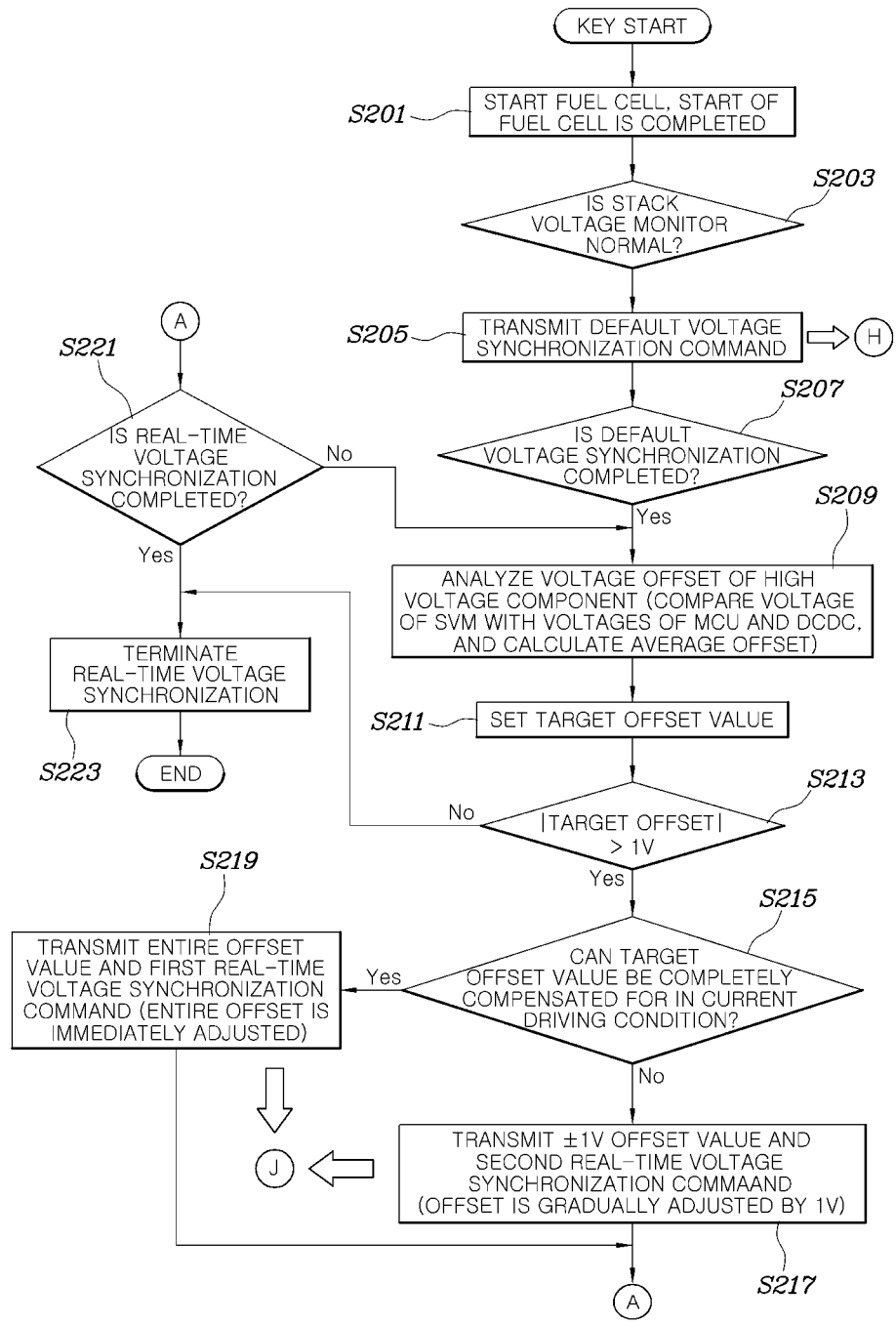
FIG. 4 is a flowchart illustrating the control process of a main controller in the method for synchronizing voltages according to an embodiment of the present invention.
Figure 5:
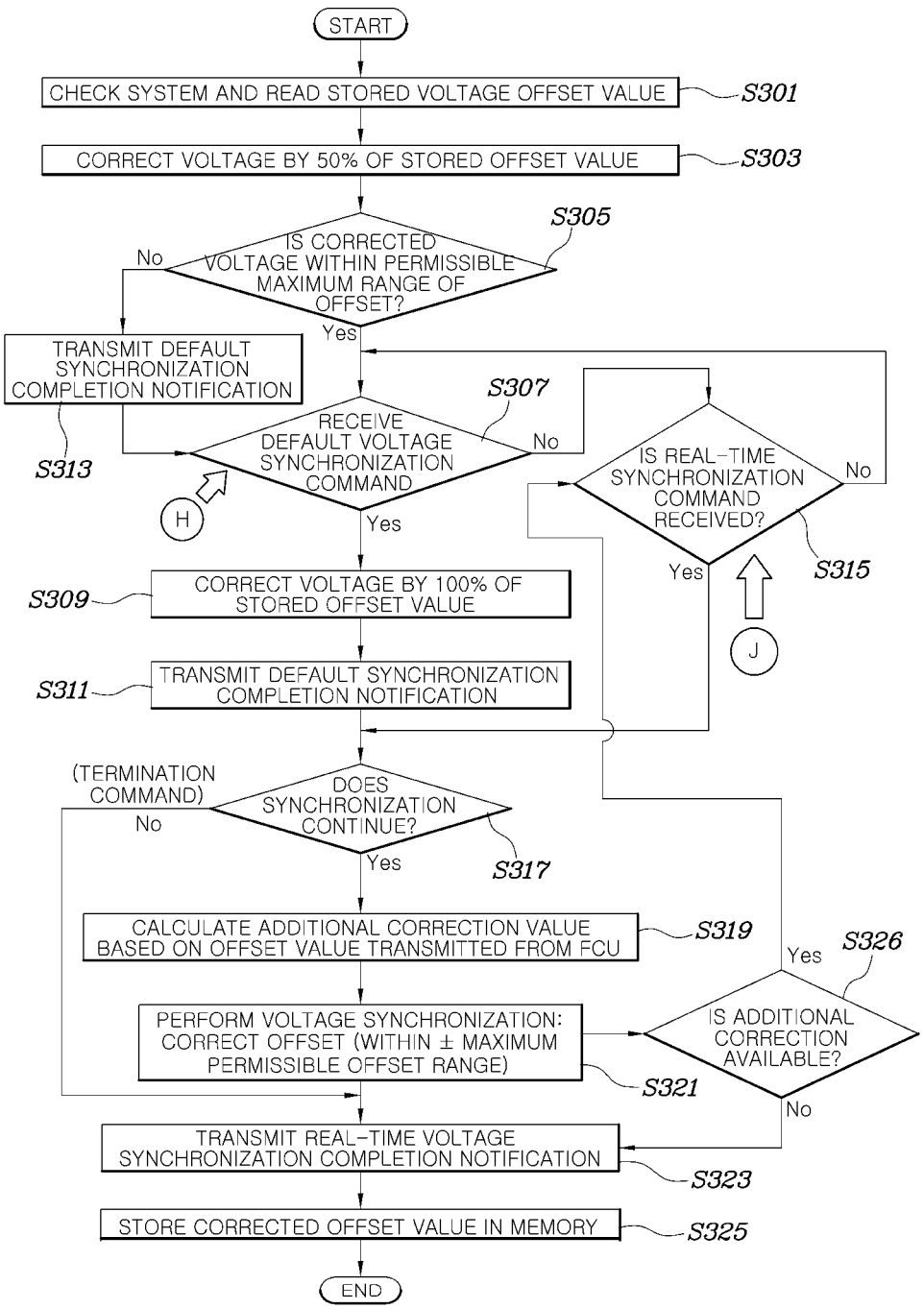
FIG. 5 is a flowchart illustrating the control process of an auxiliary controller in the method for synchronizing voltages according to an embodiment of the present invention.

FIG. 4 is a flowchart of the control process of a main controller in the method for synchronizing voltages according to an embodiment of the present invention. Also, FIG. 5 is a flowchart of the control process of an auxiliary controller in the method for synchronizing voltages according to an embodiment of the present invention.

Hereinafter, the method for synchronizing voltages according to an embodiment of the present invention will be described in detail through the description of the control processes respectively performed by the main controller 30 and the auxiliary controllers 13 and 15.

First, the control process of each of the controllers, performed in the default voltage synchronization step, is described.

Referring to FIG. 4, the control process, performed by the main controller 30 in the default voltage synchronization step, may include steps S201 to S207. When a fuel cell vehicle is started, the vehicle may be driven in EV mode, and a fuel cell separately starts to operate. In this case, regardless of whether starting of the fuel cell has been completed, the method for synchronizing voltages according to an embodiment of the present invention may be initiated. The processes performed regardless of the completion of starting of the fuel cell may be performed by the auxiliary controllers 13 and 15, which will be described later.

The main controller 30 may measure the voltage of the fuel cell stack using the fuel cell stack monitor 111 when starting of the fuel cell has been completed. Because an embodiment of the present invention uses the voltage sensed by the fuel cell stack monitor 111, which has high precision in sensing voltage, as the reference voltage, the main controller 30 may determine (S203) whether or not the fuel cell stack monitor 111 is faulty.

Subsequently, when determining that the voltage sensed by the fuel cell stack monitor 111 is normal, the main controller 30 may transmit a default voltage synchronization command to the auxiliary controllers 13 and 15 (S205). Accordingly, the auxiliary controllers 13 and 15 perform default voltage synchronization. The control process of the auxiliary controllers 13 and 15, which received the default voltage synchronization command from the main controller 30, is marked with H in FIG. 5.

Subsequently, the main controller 30 may determine (S207) that the default voltage synchronization has been completed by receiving a notification of the completion of the default voltage synchronization from the auxiliary controllers 13 and 15.

Meanwhile, as illustrated in FIG. 5, in the default voltage synchronization, when the fuel cell vehicle is started, the auxiliary controllers 13 and 15 check whether a system is normal regardless of whether starting of the vehicle has been completed. If it is determined that the system is normal, the auxiliary controllers 13 and 15 read a voltage offset value (S301), which has been stored in advance in the memory thereof. This voltage offset value may be a voltage offset value that was stored in the previous voltage synchronization step.

Subsequently, regardless of whether the default voltage synchronization command is received from the main controller 30, the auxiliary controllers 13 and 15 may correct voltages based on the stored offset value (S303). Here, the offset value may be read at the beginning of the operation of the auxiliary controllers. In the initial correction (S303), which is performed regardless of the reception of the default voltage synchronization command, because the voltages are corrected based on the past offset value, which has been stored in advance, a greater error may occur due to the deterioration of the voltage sensor of the components. Therefore, in consideration of that, the voltages may be corrected depending on a preset level rather than the offset value in the initial correction (S303), wherein the preset level is determined based on the previously stored offset value (for example, it may be 50% of the previously stored offset value). Here, the initial correction is performed in order to minimize the voltage offset value at the beginning of start-up of the vehicle, whereby control may be quickly performed and control performance may be improved.

Subsequently, the auxiliary controllers 13 and 15 compare a preset maximum permissible range of the offset with the result of correcting the voltages by the preset level (S305), which is based on the previously stored offset value. In this case, if the result of correcting the voltages by the preset level, which is based on the previously stored offset value, falls within the preset maximum permissible range of the offset, when receiving the default voltage synchronization command from the main controller 30 (S307), the auxiliary controllers 13 and 15 correct the voltages by the entire offset value (S309) and send the main controller 30 the notification of the completion of the default synchronization (S311).

Conversely, if the result of correcting the voltages by the preset level is out of the preset maximum permissible range of the offset, the auxiliary controllers 13 and 15 immediately complete the default synchronization step and send the main controller 30 the notification of the completion of the default synchronization (S313). Because additional synchronization may be performed based on an offset value that is set based on the reference voltage measured in real time in the following real-time voltage synchronization step, it is possible to sufficiently compensate for the offset although the result is out of the maximum permissible range of the offset When the auxiliary controllers 13 and 15 send the main controller 30 the notification of the completion of the default voltage synchronization (S311 and S313), the auxiliary controllers 13 and 15 may also send information about the voltages of the high voltage components, which have been corrected by the default voltage synchronization.

Hereinafter, the control processes of the main controller 30 and auxiliary controllers 13 and 15, performed in the real-time voltage synchronization step, are described.

When it receives the notification of the completion of the default voltage synchronization from the auxiliary controllers 13 and 15 (S207), the main controller 30 analyzes the magnitude of the voltage offsets of the high voltage components (S209). As described above, the auxiliary controllers 13 and 15 may transmit the voltages of the high voltage components, which are controlled by themselves, along with the notification of the completion of the default voltage synchronization to the main controller 30. The main controller 30 calculates an average offset value (S209) by analyzing the difference between the fuel cell stack voltage (that is, the reference voltage (Vref)), input from the fuel cell stack monitor 111, and the voltages of the high voltage components, transmitted from the auxiliary controllers 13 and 15.

Subsequently, based on the average offset value, the main controller 30 sets a target offset value to be compensated for by the real-time voltage synchronization of each of the auxiliary controllers 13 and 15 (S211). If the target offset value is out of a preset critical range (for example, if the absolute value of the target offset value is greater than 1 V), the main controller 30 determines that additional real-time synchronization is necessary. Conversely, if the target offset value falls within the preset critical range, it is determined that additional synchronization is unnecessary because the offset value is small enough to be within measurement error tolerance, whereby the real-time synchronization may be terminated immediately (S223).

When the target offset value is out of the preset critical range, the main controller 30 may determine whether to perform the first real-time voltage synchronization or the second real-time voltage synchronization (S215) by checking a vehicle driving condition before transmitting the real-time synchronization command In this process (S215), if the vehicle driving condition is in a state in which the entire target offset value can be compensated for, the main controller 30 may transmits both a command for performing the first real-time voltage synchronization, in which the voltages are corrected by the target offset value, and the entire target offset value to the auxiliary controllers 13 and 15 (S219). Conversely, if it is determined that the vehicle driving condition is in a state in which the entire target offset value cannot be compensated for (S215), the main controller 30 may transmit a predetermined minimum compensation offset value (for example, ±1V) and a command for performing the second real-time voltage synchronization to the auxiliary controllers 13 and 15.

Subsequently, the main controller 30 receives the voltages acquired as the result of correcting the offset value by performing the real-time voltage synchronization from the auxiliary controllers 13 and 15, and determines whether the real-time voltage synchronization step has been completed (S221). If it determines that the real-time voltage synchronization has been completed, the main controller 30 may transmit a command for terminating the real-time voltage synchronization to the auxiliary controllers 13 and 15 (S223). If the main controller 30 determines that the real-time voltage synchronization has not been completed, the above-mentioned processes (S209, S211, S213, S215, S217, and S219) may be performed again.

Meanwhile, in the real-time voltage synchronization step, the auxiliary controllers 13 and 15 receive the real-time voltage synchronization command and determine whether the command instructs to continue the synchronization (S317).

When the real-time voltage synchronization command is received from the main controller 30, if the command instructs to continue the synchronization, the auxiliary controllers 13 and 15 may perform synchronization (S321) by calculating a value that is necessary for further correction of the voltages based on the offset value (that is, the above-mentioned target offset value or minimum compensation offset value) transmitted from the main controller 30. In this case, the auxiliary controllers 13 and 15 may correct the voltages within the maximum permissible range for the offset In the process of the real-time voltage synchronization performed by the auxiliary controllers 13 and 15, because the main controller 30 transmits the offset value, which is decided by the first real-time synchronization command or the second real-time synchronization command, the auxiliary controllers 13 and 15 only need to correct the voltages based on the received offset value.

Subsequently, after the synchronization, if the result of compensating for the offset can be further corrected in the permissible range (S326), the auxiliary controllers 13 and 15 wait for a command for additional real-time voltage synchronization (S315). Conversely, if the result of compensating for the offset cannot be further corrected within the permissible range (S326), the auxiliary controllers 13 and 15 may notify the main controller 30 of the completion of the real-time voltage synchronization (S323).

Subsequently, if the real-time voltage synchronization command transmitted from the main controller 30 is a command for continuing the synchronization, the above-mentioned processes (S319, S321, S326, and S315) may be repeated. If the real-time voltage synchronization command transmitted from the main controller 30 is the command for terminating the synchronization, the auxiliary controllers notify the main controller 30 of the completion of the real-time voltage synchronization (S323), and the offset value corrected by the voltage synchronization control is stored in memory. The stored offset value may be used for the default voltage synchronization at the next start of the vehicle.

A fuel cell vehicle is driven within a maximum/minimum voltage range. When regenerative braking is performed while decelerating a vehicle, a voltage increases. Therefore, if high voltage components have voltage error, when the voltage is close to the maximum voltage, the regenerative braking cannot be maximized or a driver may feel that driving of the vehicle is not smooth because voltage derating is performed by the MCU depending on the upper limit of the voltage. Also, when accelerating the vehicle, a voltage decreases due to the maximum output of a motor. Accordingly, when the voltage is close to the minimum voltage, voltage derating is performed by the MCU depending on the lower limit of the voltage. Therefore, although the stack performance is good, the output power may decrease. Also, when the stack generates power at to low voltage with low efficiency during a cold start, heat may be maximally acquired only if the low voltage control performance is good. However, if error occurs in controlling the voltage, the cold start duration cannot be reduced. Also, if the power conversion controller has great error in controlling the voltage in the section excluding the maximum and minimum voltage sections, the high precision control performance for distributing power may be decreased. Therefore, when the above-mentioned method for synchronizing voltages of a fuel cell vehicle according to an embodiment of the present invention is applied, the voltages may be synchronized in real-time regardless of the driving condition from when the vehicle starts to when the vehicle stops, and regenerative braking performance and fuel efficiency of the fuel cell vehicle may be improved. Also, the vehicle may be prevented from vibration that may be caused by repeatedly performing and releasing the voltage derating based on the reference voltage of the MCU, the maximum output of a motor may be maintained within the maximum output range of the fuel cell stack, and the cold start time during which the fuel cell stack generates power at low voltage with low efficiency may be reduced.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A method for synchronizing voltages of a fuel cell vehicle, comprising:
    a default voltage synchronization step in which, when the fuel cell vehicle starts, voltages of high voltage components are corrected based on an offset value, and then the corrected voltages are further corrected according to a default voltage synchronization command of a main controller, the offset value having been stored in advance in a plurality of auxiliary controllers for controlling the high voltage components of the fuel cell vehicle; and
    a real-time voltage synchronization step in which, when the default voltage synchronization step has been completed, the main controller transmits a target offset value for correcting the voltages of the high voltage components to the auxiliary controllers, and the auxiliary controllers correct the voltages corrected in the default voltage synchronization step based on the target offset value, the target offset value being based on the voltages corrected in the default voltage synchronization step and an output voltage of a fuel cell stack.

2. The method of claim 1, wherein in the default voltage synchronization step,
    regardless of whether a fuel cell has been started, the plurality of auxiliary controllers correct the voltages of the high voltage components based on the stored offset value.

3. The method of claim 1, wherein in the default voltage synchronization step,
    when starting of a fuel cell has been completed, the main controller determines whether a device for measuring the stack voltage is normal, and when the device for measuring the stack voltage is normal, the main controller transmits the default voltage synchronization command to the auxiliary controllers.

4. The method of claim 1, wherein in the default voltage synchronization step,
    the plurality of auxiliary controllers correct the voltages by a preset level based on the stored offset value.

5. The method of claim 4, wherein in the default voltage synchronization step,
    when the plurality of auxiliary controllers correct the voltages by the preset level based on the stored offset value, if a result of correcting falls within a preset maximum range of an offset, the plurality of auxiliary controllers wait for the default voltage synchronization command from the main controller, whereas if the result is out of the preset maximum range of the offset, the plurality of auxiliary controllers transmit a synchronization completion signal to the main controller.

6. The method of claim 5, wherein in the default voltage synchronization step,
    when the auxiliary controllers receive the default voltage synchronization command from the main controller, the auxiliary controllers correct the voltages by the stored offset value.

7. The method of claim 1, wherein in the real-time voltage synchronization step,
    the main controller calculates an average offset value depending on a difference between the output voltage of the fuel cell stack and the voltages corrected in the default voltage synchronization step, and sets the target offset value based on the average offset value.

8. The method of claim 7, wherein in the real-time voltage synchronization step,
    when the target offset value falls within a preset critical range, the main controller terminates synchronizing the voltages.

9. The method of claim 7, wherein in the real-time voltage synchronization step,
    when the target offset value is out of a preset critical range, the main controller determines whether a magnitude of the target offset value is capable of being immediately corrected by checking a driving condition of the fuel cell vehicle.

10. The method of claim 9, wherein in the real-time voltage synchronization step,
    when the magnitude of the target offset value is capable of being immediately corrected, the main controller transmits a real-time offset compensation value corresponding to the target offset value and a first real-time voltage synchronization command for instructing compensation of the real-time offset compensation value to the auxiliary controllers.

11. The method of claim 9, further comprising an offset storage step in which the auxiliary controllers store the target offset value when receiving a voltage synchronization termination command from the main controller.

12. The method of claim 10, wherein in the real-time voltage synchronization step,
    when receiving the real-time offset compensation value, the auxiliary controllers calculate an amount of the voltage to be corrected based on the real-time offset compensation value, and correct the voltages within a preset range for offset compensation.

13. The method of claim 9, wherein in the real-time voltage synchronization step, when the magnitude of the target offset value is not capable of being immediately corrected, the main controller transmits a real-time offset compensation value corresponding to a predetermined minimum offset compensation value and a second real-time voltage synchronization command for instructing compensation of the real-time offset compensation value.

14. The method of claim 13, wherein in the real-time voltage synchronization step, when receiving the real-time offset compensation value, the auxiliary controllers calculate an amount of the voltage to be corrected based on the real-time offset compensation value, and correct the voltages within a preset range for offset compensation.

15. The method of claim 12, wherein in the real-time voltage synchronization, when it is determined that further correction is available after the auxiliary controllers correct the voltages within the preset range for offset compensation, the auxiliary controllers transmit the corrected voltages to the main controller and wait for an additional real-time voltage synchronization command.

16. The method of claim 14, wherein in the real-time voltage synchronization, when it is determined that further correction is available after the auxiliary controllers correct the voltages within the preset range for offset compensation, the auxiliary controllers transmit the corrected voltages to the main controller and wait for an additional real-time voltage synchronization command.

\* \* \* \* \*